Feb. 4, 1936.　　　　E. L. BOWLES　　　　2,029,355
ELECTRIC METER
Filed Oct. 12, 1929
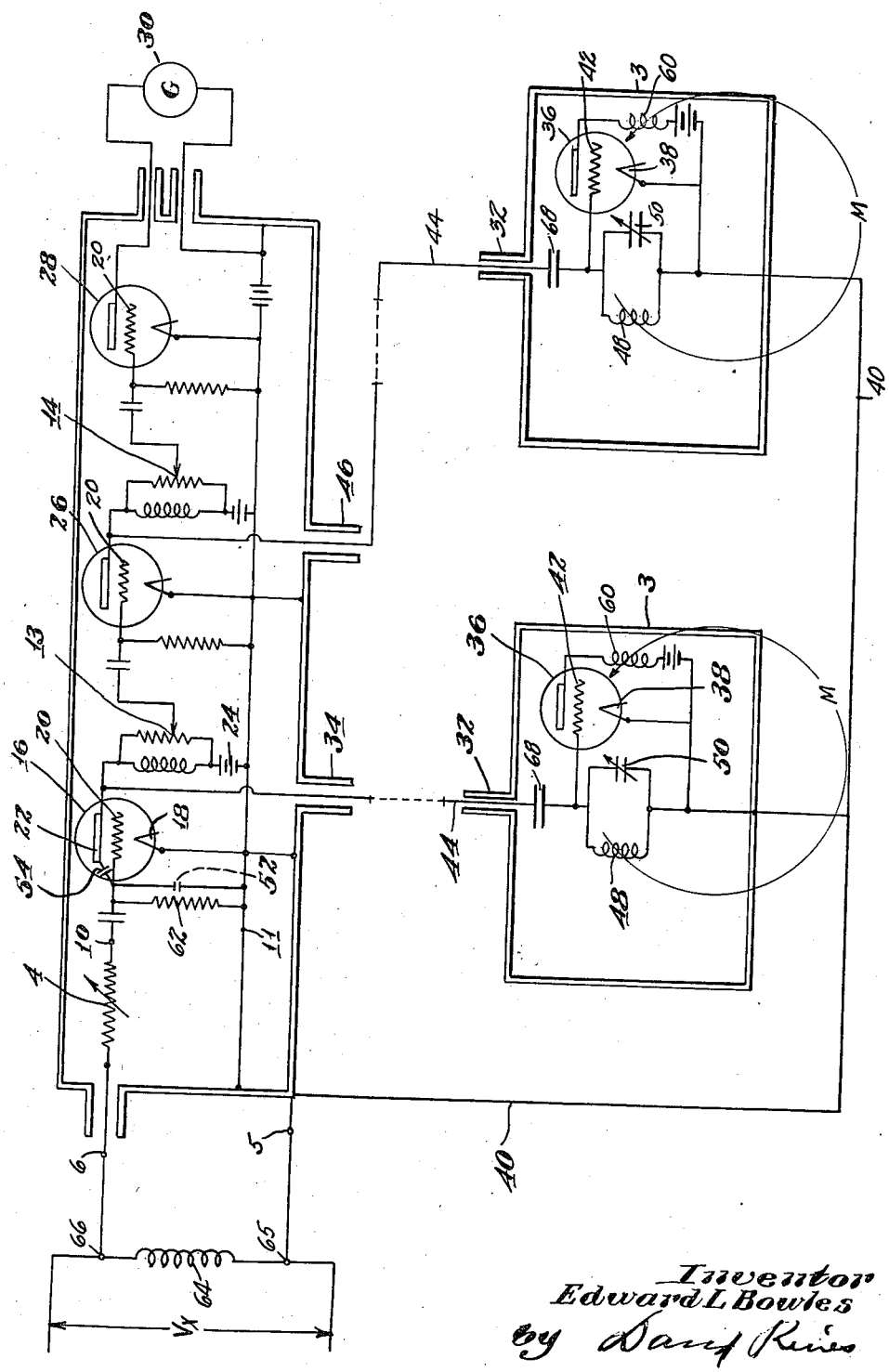
Inventor
Edward L Bowles
by David Rines
Attorney Patented Feb. 4, 1936

2,029,355

UNITED STATES PATENT OFFICE 2,029,355

ELECTRIC METER

Edward Lindley Bowles, Wellesley Farms, Mass.

Application October 12, 1929, Serial No. 399,360

27 Claims. (Cl. 175—183)

The present invention relates to electric meters, and more particularly to the measurement of alternating voltages or currents. Such meters, like voltmeters, ammeters and galvanometers, are known in the art as A. C. meters and will be so designated herein. From a more specific aspect, the invention relates to vacuum-tube A. C. meters.

A. C. vacuum-tube voltmeters of a type at present in use may comprise a plurality of stages variously coupled, the voltage to be measured being intended to be connected in the input circuit of the first tube, and a galvanometer being connected in the output circuit of the last tube. Such vacuum-tube meters are complicated and expensive, particularly where a single meter is designed for the measurement of widely differing voltages or currents. This may readily be understood when it is considered, for example, that the inductance of an impedance coupling element that is of sufficient reactance at, say, 60 cycles, would be very unsuitable at, say, 1,000 cycles. This is because, at 1,000 cycles per second, the inductor would have so much shunt-capacitive reactance, due to its self-capacitance, that it would behave as a condenser of perhaps quite low reactance. When the same impedance element is employed in the same meter at both 60 and 1,000 cycles, therefore, it is obvious that the meter might be wholly useless at one frequency, though highly efficient at another.

An object of the present invention is to improve upon and simplify present-day vacuum-tube meters.

With this end in view, a feature of the invention resides in separating the meter into a plurality of parts; one of the parts being intended for use when making all measurements, and the other parts, preferably separately shielded, being detachable and intended to be connected into circuit with the said one part to produce, together, a meter particularly designed for the particular measurement in question. The detachable connection may be effected in any desired way, as by means of a plug on one part and a socket on another part. The said one part would be common to the meter for all frequencies, but the other parts would be combined with the common part according to the particular frequency at which, or band in which, the measurement is to be made. A comparatively simple, adaptable meter is thus produced, rendered suitable for all frequencies by merely interchanging some of the parts.

In present-day A. C. instruments of the above-described character, the shunt capacitance of the input circuit of the first amplifier tube may be such as to cause the instrument to have a low input impedance. Another factor affecting the input impedance is the feed-back of energy between the plate and the grid circuits through the inter-electrode grid-plate capacitance of the tube. A further feature of the invention resides in the use of a high impedance in the input circuit of the instrument to minify these effects.

Other and further objects will be explained hereinafter and will be particularly pointed out in the appended claims.

The invention will now be explained in connection with the accompanying drawing, the single figure of which is a diagrammatic view of circuits and apparatus arranged and constructed according to a preferred embodiment of the invention.

Let it be assumed that it is desired to measure the difference of electric potential $V_x$ between any two points 65 and 66, as, for example, across an impedance 64. To accomplish this, the terminals 5 and 6 of the voltmeter are connected to the points 65 and 66. The voltage $V_x$ may first be amplified by means of an amplifier 16, shown as a vacuum tube or audion. The points 5 and 6 are shown connected in the input circuit of the amplifier 16, between the filament 18 and the grid 20. As shown, the amplified energy traverses the amplifier output circuit, that is connected between the filament 18 and the plate 22 and that comprises a battery 24. Two stages 26 and 28 of impedance-coupled amplification are also illustrated, a galvanometer 30 being connected in the output circuit of the last stage 28. This galvanometer 30 may be connected in any well known manner as, for example, directly as shown, in which the tube 28 is acting either as a detector or an amplifier; or, again, the voltmeter 30 may be connected to the tube 28 by means of a transformer. So much as has thus far been described, preferably shielded properly, will constitute the part of the meter that is common to all the measurements.

Additional separate units are furnished, according to the preferred embodiment of the present invention, one for each of the amplifier stages of the tubes 16 and 26, and each especially designed for the particular frequency at which the measurement is to be made. One such unit is shown at 3, having a plug 32 for plugging into a socket 34. Such plugging will automatically couple the unit 3 to its corresponding amplifier 16, 26, etc. This coupling unit may be of any desired or convenient nature, as an impedance or a transformer coupling. The illustrated tuned impedance coupling will now be described.

The illustrative unit 3 comprises a vacuum-tube amplifier 36, the filament 38 of which is connected by a conductor 40 with the point 5, and the grid 42 of which is connected by a conductor 44 with the plate 22 of the amplifier 16.

The vacuum tube 36 is the amplifier element in which the coil 60 in a regenerative circuit feeds back energy to the input coil 48. The source of plate potential for the tube 36 is the battery 67. To prevent short-circuiting of the battery 24, a by-pass condenser 68 is inserted in the lead 44. A similar unit (not shown) will be plugged into a socket 46 for connection with the amplifier 26. The units are preferably tuned, and accordingly the input circuit of the amplifier tube 36 is shown provided with a tuned input circuit comprising a coil 48 and a tuning condenser 50. The purpose of the adjustable tuning is to permit of using the meter over a given frequency band. The tuned amplifier unit may also be regenerative, or have its selectivity and impedance increased by other negative resistance means, as shown, for example, by the coil 60, which is coupled to the coil 48, and as indicated by M in the drawing. This regenerative coupling increases the electrical efficiency of the coil 48 and thus the selectivity of the unit 3 as between the terminals 40 and 44.

By merely plugging proper units 3 into and out of circuit, therefore, the instrument may be rendered usable over different frequency bands, at comparatively small expense, and with exceedingly simple equipment.

Whether or not the separate tuning units are employed, the present invention comprises also the use of a high impedance 4, such as a high resistance, in the input circuit of the amplifier 16. The input impedance of the instrument may thus be rendered as high as desired. For example, without the use of this resistor 4, as before described, the shunt capacitance 52 of the input circuit of the amplifier 16 may be such as to cause the galvanometer to have a low input impedance. This impedance is further affected, as also before described, by the feed-back of energy between the plate and the grid circuits of the amplifier 16, through the inter-electrode, grid-plate capacitance 54. For instance, a most troublesome situation arises here when the plate circuit is tuned by such a device as the unit 3; for with various conditions of tuning, the energy fed back to the input circuit through the grid-plate capacitance 54 varies. This results in varying the input impedance of the vacuum-tube galvanometer and, at the same time, its sensitivity. The sensitivity of the galvanometer under such conditions is then a function of the external impedance across which the terminals or points 5 and 6 are connected in making a measurement. One volt across a given low impedance, for example, might yield a certain deflection of the galvanometer 30, whereas the same voltage across an extremely high impedance, before the terminals 5 and 6 are connected, might yield an entirely different deflection when the terminals 5 and 6 are connected across this high impedance. Except for this error, the two deflections should be the same.

The high resistance of the resistor 4, then, produces two effects. In the first place, the impedance seen when looking into the input terminals of the vacuum tube galvanometer (including the resistor 4) may be made high compared with the impedance seen when looking directly into the grid-filament terminals of the tube 16 with the resistor 4 absent. It may, therefore, be made the determining factor for the input impedance between the terminals 5 and 6. It is, in this way, possible to produce such a high input impedance that the terminals 5 and 6 may be inserted directly in high-impedance circuits to measure voltages, without altering the impedance conditions existing in the circuits before such insertion. If the input impedance of the galvanometer were not high, this could not be done, for the connection of these terminals 5 and 6 with the high impedance would at once alter the impedance of the network into which these terminals had been connected. Another advantage of the resistance 4 lies in the fact that, looking toward the output of the galvanometer, from points 10 and 11, that is, looking to the right in the drawing, the resistance 4 is high compared with the impedance connected between the terminals 5 and 6. A variation in the impedance of the network under measurement, to which the terminals 5 and 6 are connected, will not, therefore, materially change the impedance measured between the terminals 10 and 11, looking toward the terminals 5 and 6. Thus, for example the overall sensitivity of the galvanometer will not vary materially, even though there may be feed-back between the plate and the grid circuits of this first tube 16.

Yet another advantage of the use of the resistor 4 is that in the ordinary types of vacuum-tube voltmeters or galvanometers, it is not a simple matter to determine whether the use of the voltmeter, that is whether the insertion of the instrument in the network, has any effect upon the behavior of the network, for example, to change or alter the voltage that existed between two points in the network before the terminals of the voltmeter are connected to these points so that the voltmeter does not indicate the true voltage (due to the fact that the input impedance of the voltmeter is comparable to the impedance looking into the two points of the network whereby the insertion of the voltmeter into the network alters the voltage distribution of the network). The measurements are not, therefore, certain, unless checked by some independent method. On the other hand it is very convenient, with the resistor 4, to make two or three successive measurements, with two or three successive values of the resistance 4, and if the voltages measured are the same (using the substitution method of measurement of course), it is quite evident that the input impedance of the galvanometer is negligible compared with the impedance of the network.

It is, therefore, oftentimes convenient to have the resistor 4 divided into two or more parts, so that any desired fraction or the whole of it may be inserted into circuit, to check the correctness of its relative magnitude. It is pointed out that this method of checking by incrementally changing the resistance of the resistor 4, as described, makes it possible to determine whether or not the resistance of the unit 4 is high enough without having to know the actual value of the resistance.

Measurements may be made by the comparison method, the galvanometer 30 not being calibrated. The terminals 5 and 6 are first connected across a circuit the unknown voltage of which is to be measured. Then the over-all sensitivity of the galvanometer is adjusted by means of sliders 13 and 14, until the galvanometer 30 gives a substantial deflection. This may be adjusted from a single control (not shown). The terminals 5 and 6 are then connected to a calibrated voltage source, which may be varied until the same deflection of the galvanometer 30 results. The unknown voltage is thus read from the calibrated voltage source.

Though the invention has been described above as applied to the measurement of voltages, it is to be understood that the invention is equally applicable to the measurement of currents. Ammeters operate upon the same principle as voltmeters, the measurement of current involving merely the measurement of the voltage drop across a known impedance. Thus, to measure current instead of voltage, all that is necessary is to connect the terminals 5 and 6 across a resistor in which the current exists.

It will be understood that the invention is not limited to the exact embodiment thereof that is illustrated and described herein, but that modifications may be made by persons skilled in the art without departing from its spirit and scope, as defined in the appended claims.

What is claimed is:

1. A vacuum-tube A. C. meter comprising a plurality of coupled vacuum tubes, means for connecting the vacuum tubes to a source of voltage to be measured, an indicating instrument connected in the output circuit of one of the tubes for measuring the voltage of the source, a vacuum-tube amplifier, and means for detachably coupling the vacuum-tube amplifier to a first-named tube without affecting the connection of the first-named tubes to the connecting means.

2. A vacuum-tube A. C. meter comprising a plurality of coupled vacuum tubes, means for connecting the vacuum tubes with a circuit having a source of voltage to be measured, an indicating instrument connected in the output circuit of one of the tubes for measuring the voltage of the source, a vacuum-tube amplifier coupled to one of the tubes, and an impedance in the input circuit of one of the tubes, the value of the impedance being high compared with the impedance of the circuit.

3. A vacuum-tube A. C. meter comprising a plurality of coupled vacuum tubes, an indicating instrument connected in the output circuit of the last tube, a tuned vacuum-tube amplifier coupled to the output circuit of the first vacuum tube and a resistor of high value in series with the input circuit of the said first tube.

4. A vacuum-tube A. C. meter comprising a plurality of coupled vacuum tubes, an indicating instrument connected in the output circuit of the last tube, a tuned vacuum-tube amplifier coupled to the first tube, and an adjustable impedance of high value relative to the impedance of the external input circuit connected in the input circuit of the said first tube.

5. A vacuum-tube A. C. meter comprising a vacuum tube having an input circuit, means for connecting the vacuum tube to a circuit having a source of voltage to be measured, an indicating instrument connected in the output circuit of the tube for measuring the voltage of the source, and an impedance in series with the input circuit, said impedance being of such value as to render the input impedance of the meter substantially constant.

6. A vacuum-tube A. C. meter comprising a plurality of coupled vacuum tubes, means for connecting the vacuum tubes with a circuit having a source of voltage to be measured, an indicating instrument connected in the output circuit of the last tube, and an impedance in series with the input circuit of the said first tube, said impedance being of such value as to render the input impedance of the meter substantially constant.

7. A vacuum-tube A. C. meter comprising a vacuum tube, means for connecting the vacuum tube to a source of voltage to be measured, an indicating instrument connected in the output circuit of the tube, a vacuum-tube amplifier and means for detachably coupling the vacuum-tube amplifier to the first-named tube without affecting the connection of the first-named tube to the connecting means.

8. A vacuum-tube A. C. meter comprising a vacuum tube having an output circuit, an indicating instrument connected in the output circuit of the tube, a vacuum-tube amplifier, and means for detachably coupling the vacuum-tube amplifier to the output circuit without affecting the connection of the indicating instrument in the output circuit.

9. A vacuum-tube A. C. meter comprising a vacuum tube having two circuits, namely, an input circuit and an output circuit, means for connecting the input circuit with a circuit having a source of voltage to be measured, an indicating instrument connected with the output circuit for measuring the voltage of the source, a tuned circuit in shunt to one of the tube circuits, and an impedance connected in series with the input circuit, the value of the impedance being high compared with the impedance of the circuit having the source, said impedance being of such value as to render the input impedance of the meter substantially constant.

10. A vacuum-tube A. C. meter comprising a vacuum tube, an indicating instrument connected in the output circuit of the tube, a vacuum-tube amplifier coupled to the output circuit of the tube and a resistor of high value in series with the input circuit of the first tube.

11. A vacuum-tube A. C. meter comprising a vacuum tube, an indicating instrument connected in the output circuit of the tube, a vacuum-tube amplifier coupled to the tube, and an adjustable impedance of high value relative to the impedance of the external input circuit connected in the input circuit of the said tube.

12. A vacuum-tube A. C. meter comprising a vacuum tube, means for connecting the vacuum tube to a source of voltage to be measured, an indicating instrument connected in the output circuit of the tube for measuring the voltage of the source, a regeneratively tuned circuit, and means for detachably coupling the regeneratively tuned circuit to the tube without affecting the connection of the tube to the connecting means.

13. A vacuum-tube A. C. meter comprising a plurality of coupled vacuum tubes, means for connecting the vacuum tubes to a source of voltage to be measured, an indicating instrument connected in the output circuit of one of the tubes for measuring the voltage of the source, a regenerative coupling circuit, and means for detachably coupling the regenerative circuit to a first-named tube without affecting the connection of the first-named tubes to the connecting means.

14. A vacuum-tube A. C. meter comprising a vacuum tube, an indicating instrument connected in the output circuit of the tube, and a regenerative vacuum-tube inter-stage coupling amplifier detachably coupled to the tube.

15. A vacuum-tube A. C. meter comprising a plurality of coupling vacuum tubes, an indicating instrument connected in the output circuit of one of the tubes, and a regenerative vacuum-tube inter-stage coupling amplifier detachably coupled to a first-named tube.

16. A vacuum-tube alternating-current meter comprising a plurality of coupled vacuum tubes, means for connecting the coupled vacuum tubes to a source of voltage to be measured, an indicating instrument connected with the coupled vacuum tubes for indicating the voltage of the source, an amplifier, and means for coupling the amplifier to one of the plurality of coupled vacuum tubes.

17. A vacuum-tube alternating-current meter comprising a plurality of coupled vacuum tubes, means for connecting the coupled vacuum tubes to a source of voltage to be measured, an indicating instrument connected with the coupled vacuum tubes for indicating the voltage of the source, a plurality of amplifiers of different characteristics respectively corresponding to the desired response characteristics of the indicating instrument for different voltage sources, and means for at different times coupling the amplifiers selectively to any one of a plurality of coupled vacuum tubes.

18. A vacuum-tube alternating-current meter comprising a plurality of coupled vacuum tubes, means for connecting the coupled vacuum tubes to a source of voltage to be measured, an indicating instrument connected with the coupled vacuum tubes for indicating the voltage of the source, a tuned amplifier, and means for coupling the amplifier to one of the plurality of coupled vacuum tubes.

19. A vacuum-tube alternating-current meter comprising a plurality of coupled vacuum tubes, means for connecting the coupled vacuum tubes to a source of voltage to be measured, an indicating instrument connected with the coupled vacuum tubes for indicating the voltage of the source, a plurality of tuned amplifiers of different characteristics respectively corresponding to the desired response characteristics of the indicating instrument for different voltage sources, and means for at different times coupling the amplifiers selectively to any one of a plurality of the coupled vacuum tubes.

20. A vacuum-tube alternating-current meter comprising a plurality of coupled vacuum tubes, means for connecting the coupled vacuum tubes to a source of voltage to be measured, an indicating instrument connected with the coupled vacuum tubes for indicating the voltage of the source, a regeneratively tuned, vacuum-tube amplifier, and means for coupling the amplifier to one of the plurality of coupled vacuum tubes.

21. A vacuum-tube alternating-current meter comprising a plurality of coupled vacuum tubes, means for connecting the coupled vacuum tubes to a source of voltage to be measured, an indicating instrument connected with the coupled vacuum tubes for indicating the voltage of the source, a plurality of regeneratively tuned, vacuum-tube amplifiers of different characteristics respectively corresponding to the desired response characteristics of the indicating instrument for different voltage sources, and means for at different times coupling the amplifiers selectively to any one of a plurality of the coupled vacuum tubes.

22. A vacuum-tube alternating-current meter comprising a plurality of vacuum tubes each having an input circuit and an output circuit, the input circuit of each of a plurality of the tubes being adjustably coupled to the output circuit of the next preceding tube, means for connecting the input circuit of the first tube to a source of voltage to be measured, an indicating instrument connected in the output circuit of the last tube for indicating the voltage of the source, an amplifier, and means for detachably coupling the amplifier to one of the plurality of vacuum tubes.

23. A vacuum-tube alternating-current meter comprising a plurality of vacuum tubes each having an input circuit and an output circuit, the input circuit of each of a plurality of the tubes being adjustably coupled to the output circuit of the next preceding tube, means for connecting the input circuit of the first tube to a source of voltage to be measured, an indicating instrument connected in the output circuit of the last tube for indicating the voltage of the source, a plurality of amplifiers of different characteristics respectively corresponding to the desired response characteristics of the indicating instrument for different voltage sources, and means for at different times coupling the amplifiers selectively to any one of a plurality of the vacuum tubes.

24. A vacuum-tube alternating-current meter comprising vacuum-tube apparatus, means for connecting the vacuum-tube apparatus with a circuit having a source of voltage to be measured, an indicating instrument connected with the vacuum-tube apparatus for indicating the voltage of the source, and an impedance connected in series between the vacuum-tube apparatus and the said circuit, the value of the impedance being high compared with the impedance of the circuit.

25. A vacuum-tube alternating-current meter comprising vacuum-tube apparatus, means for connecting the vacuum-tube apparatus with a source of voltage to be measured, an indicating instrument connected with the vacuum-tube apparatus for indicating the voltage of the source, an amplifier, means for coupling the amplifier to the vacuum-tube apparatus, and means for regeneratively tuning the amplifier.

26. A vacuum-tube A. C. meter comprising a vacuum tube having an input circuit, means for connecting the vacuum tube to a source of voltage to be measured, an indicating instrument connected in the output circuit of the tube, a space-current device, and means for detachably coupling the space-current device to the input circuit without affecting the connection of the first-named tube to the connecting means.

27. A vacuum-tube alternating-current meter comprising vacuum-tube apparatus provided with an input circuit having impedance, means for connecting the vacuum-tube apparatus to two terminals across which is a source of voltage to be measured and between which there is an impedance, an indicating instrument connected with the vacuum-tube apparatus for indicating the voltage across the said two terminals, and means for increasing the said impedance of said input circuit to a value so high compared with the said second-named impedance between said two terminals that the said second-named impedances between said two terminals will be negligible compared with the impedance of said input circuit, whereby the impedance between said terminals will be substantially constant irrespective of the connection thereto of said input terminals of said vacuum-tube apparatus, and whereby the connecting of the vacuum-tube apparatus to the said two terminals will not alter the said voltage to be measured across the said two terminals.

EDWARD LINDLEY BOWLES.